United States Patent [19]
Gallagher

[11] Patent Number: 5,441,078
[45] Date of Patent: Aug. 15, 1995

[54] DEVICE FOR TERMINATING FLOW OF A LIQUID AFTER CONTINUOUS FLOW OF A PREDETERMINED DURATION

[76] Inventor: Anthony D. Gallagher, 1551 NW. 65th Ave., Plantation, Fla. 33313

[21] Appl. No.: 110,415

[22] Filed: Aug. 20, 1993

[51] Int. Cl.⁶ ............................................. F16K 21/06
[52] U.S. Cl. .............................. 137/624.14; 137/624.13
[58] Field of Search ....................... 137/624.14, 624.13; 239/67

[56] References Cited

U.S. PATENT DOCUMENTS 4,086,933  5/1978  Pansini .................. 137/624.14 X
5,050,772  9/1991  Brane et al. ............. 137/624.11 X

*Primary Examiner*—Gerald A. Michalsky
*Attorney, Agent, or Firm*—Malin, Haley, DiMaggio & Crosby

[57] ABSTRACT

A device for terminating flow of a liquid (e.g., water) after flow of a predetermined duration. The device is able to reset itself if flow is for a period less that the predetermined duration, as well as when the flow exceeds the predetermined duration. The device generally includes a housing, an inlet and an outlet, bypass ports, a turn off valve, a valve seat, a water wheel, reduction gears and a valve ratchet and spring. In operation, the fluid enters the housing through the inlet and strikes the water wheel which is connected to the valve ratchet through the reduction gears. The rotational movement of the water wheel is translated into linear movement of the valve ratchet. If the water runs for longer than the predetermined duration, the valve ratchet causes the turn off valve to be seated in the valve seat and the flow is terminated. If the water is turned off prior to the predetermined duration, the spring returns the turn off valve to the open position for subsequent water use. After the turn off valve is seated, the bypass ports allow the turn off valve to be reopened when pressure is equal on both sides of the turn off valve, as when the faucet is turned off or the leak is repaired.

9 Claims, 5 Drawing Sheets

DEVICE FOR TERMINATING FLOW OF A LIQUID AFTER CONTINUOUS FLOW OF A PREDETERMINED DURATION

BACKGROUND OF THE INVENTION

1. Field of the Invention

The present invention is directed to a device for terminating flow of a liquid, and particularly to a device which terminates the flow after continuous (i.e., uninterrupted) flow of a predetermined duration.

The device is useful in any application in which it is desired to limit the continuous (i.e., uninterrupted) flow of a liquid to a predetermined length of time, e.g., 20 minutes. The device is particularly useful when connected in series with the outside water supply of a residence, office or factory building for preventing water damage from broken pipes, and can also be used to prevent flooding in a water vessel such as a boat, house boat or yacht.

2. Description of the Background Art

Many conventional devices monitor and/or control the flow of fluids.

U.S. Pat. No. 5,050,772 issued on Sep. 24, 1991 to Brane et al. and discloses a device which is connected in series with an ordinary household filter to stop the flow of water after a period of time corresponding to the life of the filter. The device has a turbine, gears and a valve to limit the flow of water according to the reduction ratio of the gears and the rate of the incoming water flow.

In the device disclosed in the '772 patent, when the water is turned on and then off, as in normal use, the device does not reset itself. The purpose of the device is to measure the cumulative flow of the water, thus the device does not reset itself until the predetermined period of time has elapsed. The predetermined period of time may be many hours to allow for the filter to become expired. If the time period is made shorter, e.g., 20 minutes, the device must be reset by hand at each 20 minute interval, and the device is not able to reset itself when the flow of water is for less time than the predetermined time period. In other words, the device measures cumulative flow regardless of the duration of any given period or duration of continuous (i.e., uninterrupted) flow.

U.S. Pat. No. 3,807,452 issued to Buckman on Apr. 30, 1974 and discloses an automatic fluid timer device which uses mechanical and hydraulic means. The device employs a diaphragm-actuated shaft which causes a valve to be raised or lowered off or on its seat and the flow direction control valve to open and close the appropriate ports. This device is structurally complex and thus is expensive to manufacture and assemble.

U.S. Pat. No. 4,522,221 issued to Chivens et al. on Jun. 11, 1985 and discloses a timed flow control valve for regulating fluid flow from a valve input to primary and secondary fluid flow outlets.

A timer/control is used to select between the primary and the secondary fluid flow outlets, and a solenoid and springs are used in combination to open and close the valves. This device is also structurally complex. Further, this device employs electrical circuitry.

Many conventional devices employ a turbine and gearing to distribute a liquid (e.g., water) through a plurality of ports in a rotary valve.

U.S. Pat. No. 4,461,319 issued on Jul. 24, 1984 to Macosko and discloses a water modulator which has a turbine, gears and a rotary valve for varying the flow rate in accordance with the cyclical periodic operation of the rotary valve.

The water modulator disclosed in the '319 patent does not act to terminate the flow of liquid after a predetermined duration, and the device is not able to reset itself if the continuous (i.e., uninterrupted) flow is shorter or longer than the predetermined duration. Rather, in Macosko's device, the turbine and gearing impart rotational movement on the rotary valve to produce the cyclical periodic water flow.

U.S. Pat. No. 4,817,656 issued Apr. 4, 1989 to Gould and discloses a fluid distribution apparatus with an impeller-driven gear reduction mechanism and more than one outlet valve controlled in response to the gear reduction mechanism. This device suffers from the same deficiencies noted above with respect to the modulator disclosed in the Macosko '319 patent, i.e., the device does not terminate flow of a liquid after a continuous (i.e., non-interrupted) flow of a predetermined duration, nor can the device reset itself after flow of a predetermined duration.

Various other references disclose devices which include gears for alternately directing fluid through a plurality of outlet ports and/or which include electrical means for controlling the flow rate of a liquid. Nonetheless, there are presently no simple mechanical devices which are able to terminate flow of a liquid after the liquid flows continuously for a predetermined duration.

SUMMARY OF THE INVENTION

It is an object of the present invention to provide a device for monitoring the amount of time that liquid is flowing and for terminating the flow if the uninterrupted time exceeds a predetermined duration.

It is a further object of the present invention to provide a device which will automatically recycle (i.e., reset itself) when the uninterrupted flow is less than the predetermined duration.

It is a further object of the present invention to provide a device which will automatically reset itself after flow is terminated by the device.

It is a further object of the present invention to provide a device which is simple in structure and which can effectively and efficiently terminate water flow after a predetermined period of continuous (i.e., non-interrupted) flow.

It is a further object of the present invention to provide a completely mechanical device which is simple and inexpensive to manufacture and maintain.

The above and other objects are attained by the invention as described more fully below and which generally includes a housing having an inlet and an outlet, bypass ports, a turn off valve, a valve seat, a biasing spring and valve ratchet, a water wheel or paddle, and reduction gears.

The device may be connected, for example, in series with, and upstream of, a water supply pipe to a dwelling or a water vessel. In operation, when a faucet in the dwelling or vessel is turned on, or when there is a leak, water runs continuously through the supply pipe and enters the inlet of the housing. The water impacts against the water wheel which is caused to rotate. The water wheel is connected to a valve ratchet via a series of reduction gears, and the valve ratchet is connected to the turn off valve.

As the reduction gears turn, the valve ratchet is advanced, and the turn-off valve is closed (i.e., the turn off valve is seated against the valve seat) so that the supply or flow of water is terminated. If the flow is terminated (i.e., the faucet is shut off or the leak is repaired) before the turn off valve is seated, the biasing spring forces the turn off valve to an open position to "reset" the device for subsequent water use. If the water supply remains on (i.e., the faucet is not turned off or the leak is not repaired) for a predetermined duration (e.g., 20 minutes) corresponding to the selected reduction gears, then the turn off valve is seated by operation of the reduction gears and valve ratchet, and the supply of water is thereby terminated through the inlet to prevent flooding of the house, vessel, etc. Bypass ports allow water to escape past the turn off valve after the turn off valve has been seated. The turn off valve will not open again until the pressure is equal on both sides of the turn off valve, such as is the case with a repaired leak or when the leaking faucet has been turned off for a predetermined duration.

BRIEF DESCRIPTION OF THE DRAWINGS

For a fuller understanding of the nature and objects of the invention, reference should be had to the following detailed description and the accompanying drawings, in which.

DETAILED DESCRIPTION OF THE PREFERRED EMBODIMENT

Figure 1:
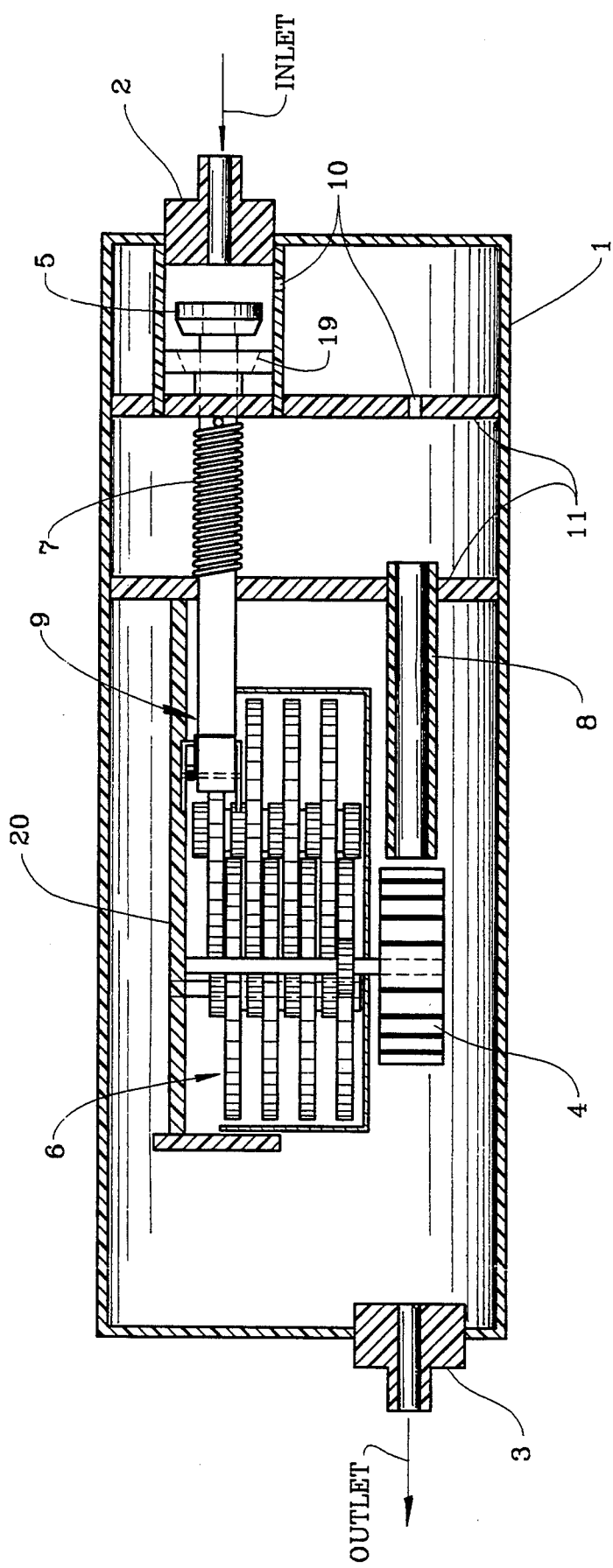
FIG. 1 is a top, partial sectional view of a device for terminating flow according to the present invention.
Figure 2:
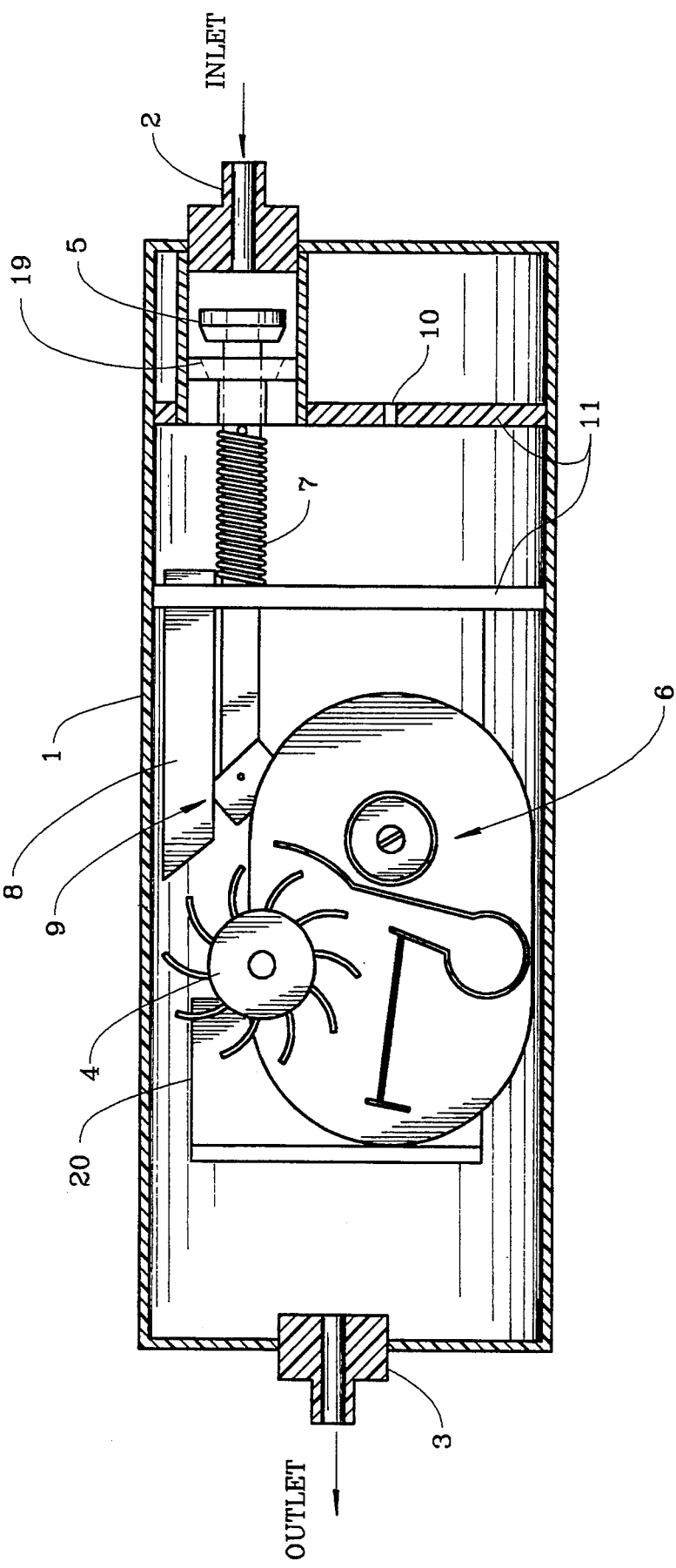
FIG. 2 is a front, partial sectional view of the device illustrated in FIG. 1.

FIGS. 1 and 2 are top and front partial sectional views, respectively, of the flow terminating device according to the present invention. Identical reference numerals are used to identify identical parts of the device.

In FIGS. 1 and 2, the cylinder housing is indicated by reference numeral 1, the inlet and outlet by 2 and 3, respectively, the water wheel or paddle by 4, the turn off valve by 5, the reduction gears by 6, the biasing spring by 7, the valve ratchet by 9, the bypass ports by 10 and the valve seat by 19.

Reference numeral 8 indicates a direction spout for directing the liquid towards the water wheel or paddle 4, reference numeral 11 indicates two partitions within the housing 1, and reference numeral 20 indicates a frame provided within the housing for supporting the reduction gears 6 and the water wheel or paddle 4. The shape of the housing 1 is not limited to a cylinder, but may be any shape suitable for accommodating the liquid and the various parts of the device. Further, the liquid is not limited to water, but may be any other liquid for which it is desired to limit continuous flow to a predetermined duration.

Figure 6:
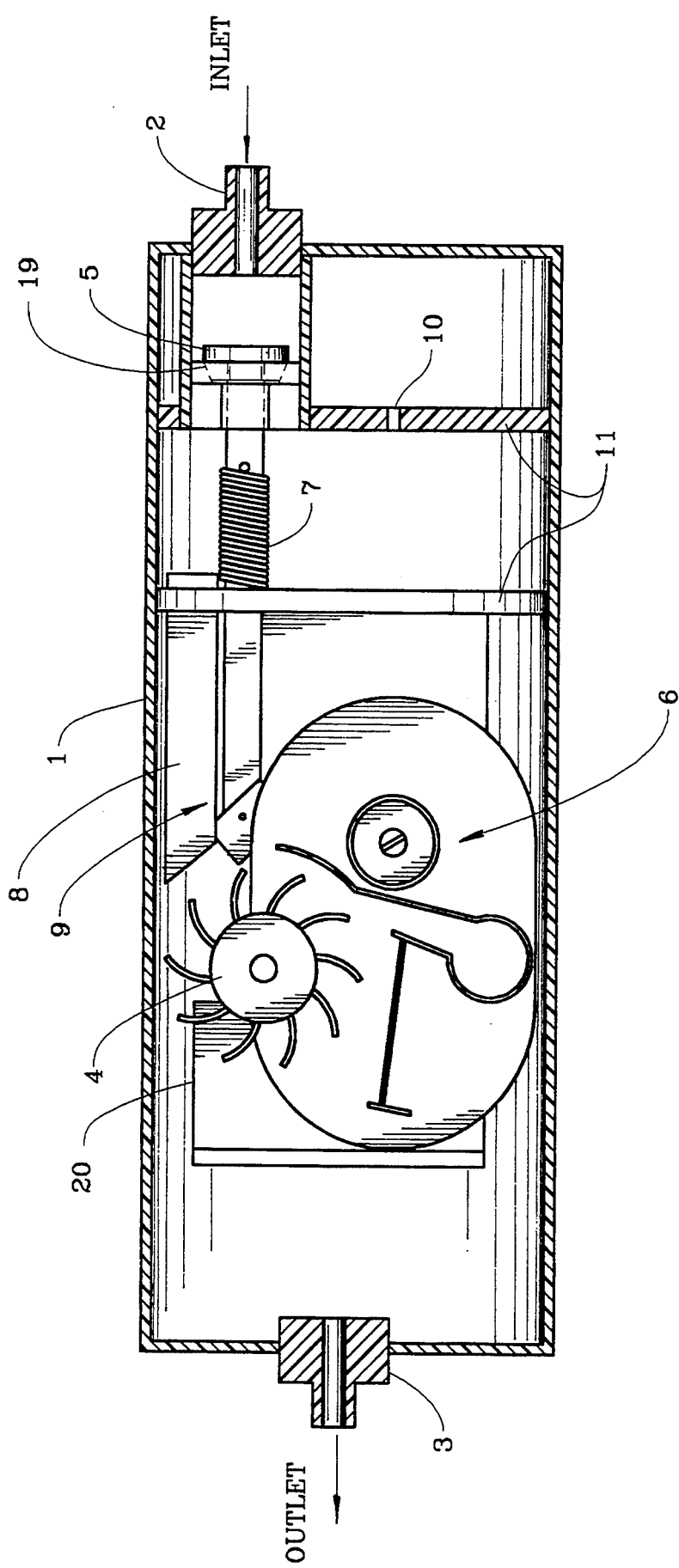
FIG. 6 is a front, partial sectional view similar to FIG. 2, but with the turn off valve seated.

FIG. 6 is a front, partial sectional view similar to FIG. 2, but shows the turn off valve 5 in a seated position in the valve seat 19 (i.e., the turn off valve 5 is closed). The turn off valve 5 is caused to be seated in the valve seat 19 by the action of the valve ratchet 9, the reduction gears 6 and the water wheel 4.

Figure 3:
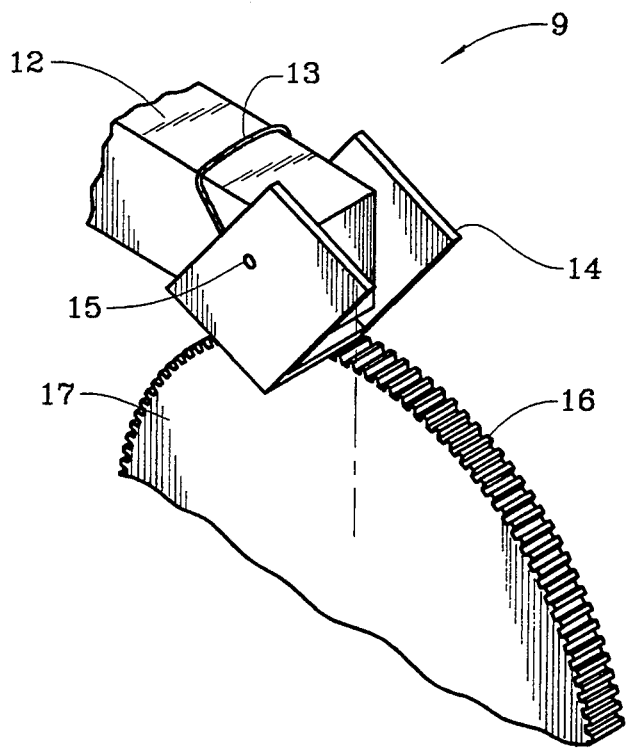
FIG. 3 is a perspective view of a valve ratchet according to the present invention.
Figure 4:
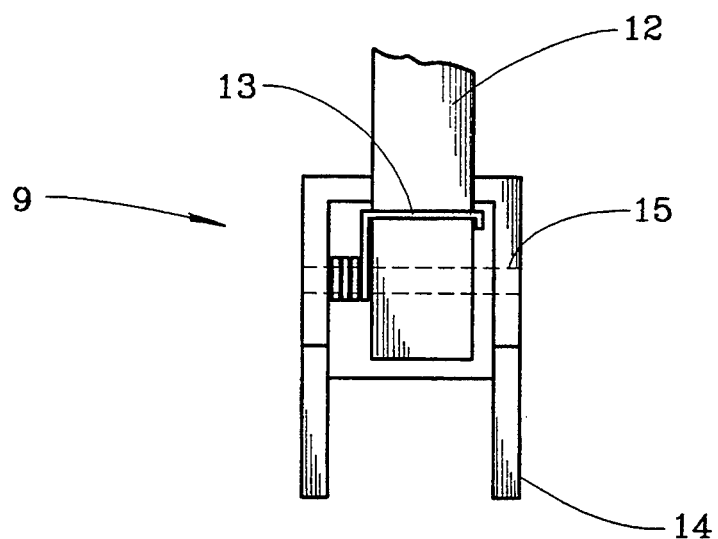
FIG. 4 is a top (plan) view of the valve ratchet illustrated in FIG. 3.

The valve ratchet 9 is shown in more detail in FIGS. 3 and 4. The valve ratchet 9 includes a U-shaped engaging piece 14 which is rotatably connected to an end of a ratchet arm 12 with a linking pin 15. A spring 13 is wrapped around the linking pin 15 to bias the U-shaped engaging piece in a downward direction, so as to engage the teeth 16 of a final gear 17 of the reduction gears 6.

Figure 7:
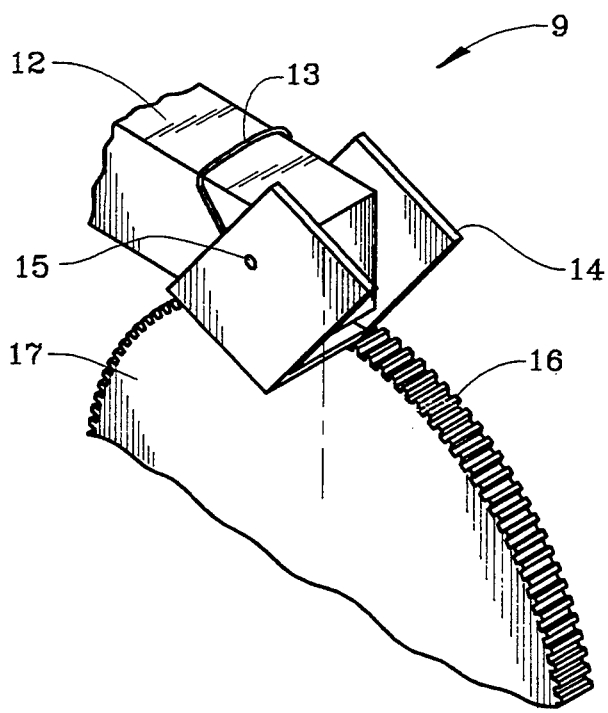
FIG. 7 is a perspective view similar to FIG. 3, but with the turn off valve seated.

FIG. 7 is a perspective view similar to FIG. 3, but shows the valve ratchet 9 in a fully engaged position, i.e., with the turn off valve 5 seated in the valve seat 19. The valve ratchet 9 engages the teeth 16 of the final gear 17 to move the ratchet arm 12 leftwardly in FIGS. 1 and 2 so that the turn off valve 5 is seated in the valve seat 19 after a predetermined period of time determined according to the reduction ratio of the reduction gears 6.

The valve ratchet 9 shown in FIGS. 3, 4 and 7 is only one example of a device for translating rotational movement of the gear into linear movement of the ratchet arm 12, and the present invention is not intended to be limited as such. For example, a ramp roller device or a hyperboloidal device may be used in place of the valve ratchet.

Figure 5:
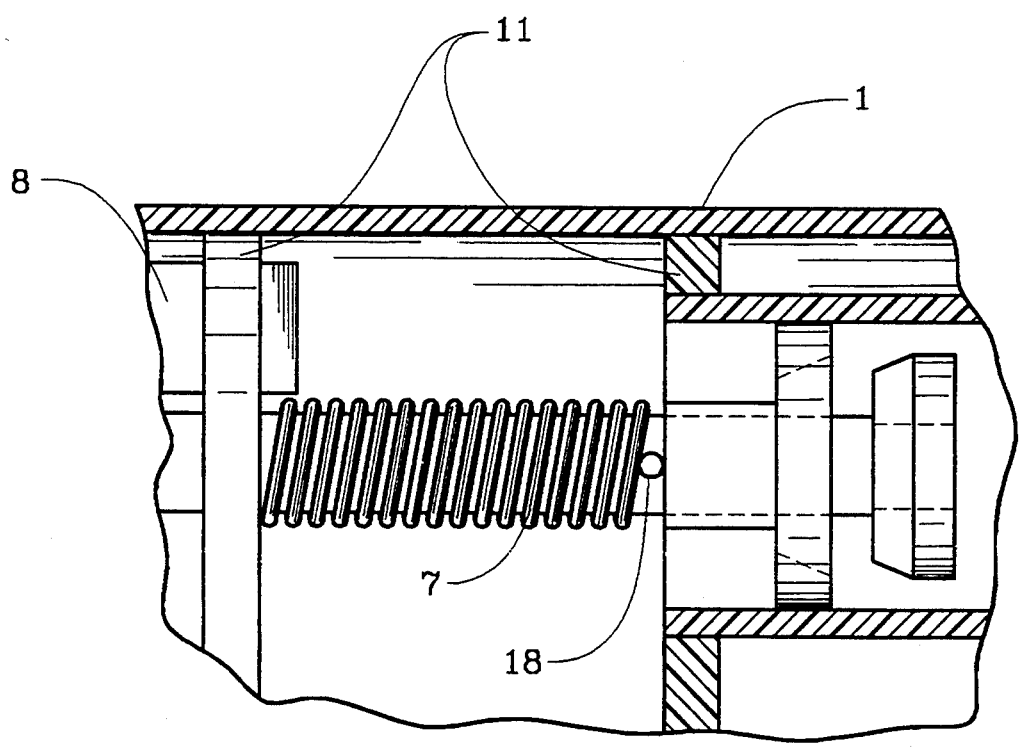
FIG. 5 is a front, partial sectional view (exploded) of the biasing spring according to the present invention.

FIG. 5 is a front, partial sectional view (exploded) showing, in more detail, the biasing spring 7 of the present invention. The spring 7 is wrapped around the ratchet arm 12 at a portion thereof extending between the partitions 11. The left end of the spring 7 (as seen in FIGS. 1 and 5) abuts against the left partition 11, and the right end of the spring 7 abuts against a pin 18 which extends through and protrudes from the ratchet arm 12. The spring 7 biases the ratchet arm to the right in FIGS. 1 and 5, i.e., to open the turn-off valve 5. Specifically, the spring 7 causes the ratchet arm 12 and, thus, the turn off valve 5 to move away (rightwardly in the figures) from the valve seat 19 thereby maintaining an open passage in the turn-off valve 5 for allowing the liquid to pass through the inlet 2 and into the cylinder housing 1. The inlet 2, the turn off valve 5 and the valve seat 19 are in fluid communication.

The device of the present invention may, for example, be connected in series with the water supply line to a house or to a vessel at a dock. When the water supply is turned on, e.g., a faucet in the house or boat is turned on, or if there is a leak somewhere, water is directed through inlet 2 and into the cylinder housing 1. The turn off valve 5 is assumed to be in an open position due to the biasing force of the spring 7.

Water is directed through the inlet 2 and fills the chamber between the partitions 11. Water is also directed through the bypass ports (holes) 10 formed in the inlet 2 and the left partition 11 so that the space between the end of the housing 1 and the left partition 11 is also filled with water.

Water between the partitions 11 is directed through the directional spout 8 and against the water wheel 4 so that the water wheel spins at a predetermined revolution rate corresponding to the speed of the flowing water.

The water wheel 4 is connected to a series of reduction gears 6 which reduce the revolution rate of the water wheel 4 to a predetermined level corresponding to the predetermined duration. The final reduction gear drives the valve ratchet 9 so that the rotational movement of the water wheel 4 and the reduction gears 6 is converted into the linear movement (to the left in FIG. 1) of the valve ratchet 9 and the ratchet arm 12, i.e., the valve ratchet 9 is a translational device for translating the rotational movement of the water wheel 4 and the reduction gears 6 into linear motion of the arm 12 for closing the inlet valve 2. As noted above, the U-shaped engaging piece 14 is biased against the teeth 16 of the final reduction gear 17 by the force of biasing spring 13, and the U-shaped engaging piece 14 is pivotally mounted on the end of the ratchet arm 12 by the linking pin 15.

The reduction gears 6 are selected so that a continuous (i.e., uninterrupted) flow of a predetermined duration (e.g., 20 minutes) results in sufficient linear motion of the ratchet arm 12 to seat (i.e., close) the turn off valve 5 so that flow is terminated.

If the flow of the liquid is terminated (e.g., the faucet is turned off or the leak is repaired) within the predetermined duration (i.e., before the turn off valve 5 is seated in the valve seat 19), then the force of the biasing spring 7 is sufficient to cause the turn off valve 5 to open fully so that the faucet can be turned on again at a later time or so that the supply of water can be restarted once the leak is fixed, and the full predetermined duration is once again available. That is, as the flow rate is reduced to zero, the force exerted by the biasing spring 7 becomes sufficient to move the turn off valve 5 (right in FIG. 1) to a fully open position.

When the turn off valve 5 becomes seated in the valve seat 19, such as when water is allowed to flow continuously for a period of time longer than the predetermined duration, the turn off valve 5 stays closed. However, a small amount of liquid is allowed to pass through the bypass ports 10 to pressurize the output side of the flow guard. The turn off valve 5 will not open again (i.e., become unseated) until the liquid pressure becomes equal on both sides of the turn off valve 5, such as would occur with the repair of a leak or by turning the faucet off.

The instant invention has been shown and described herein in what are considered to be the most practical and preferred embodiments. It is recognized, however, that numerous departures may be made therefrom within the scope of the invention and that obvious modifications will occur to a person skilled in the art.

I claim:

1. A device connected in a liquid supply line for preventing continuous flow of a liquid from a liquid source beyond a predetermined duration, comprising:
a housing;
an inlet and an outlet provided in said housing for fluidly connecting said housing in series with the liquid supply line;
means for interrupting flow of liquid movable between an open position, wherein liquid is allowed to flow through said housing by entering said inlet and exiting said outlet, and a closed position wherein liquid flow through said housing substantially terminates;
said means for interrupting flow of liquid biased to a normally open position by a biasing means;
a means for measuring the duration of flow of water through said housing, said means for measuring having a means for moving said means for interrupting after a predetermined time of constant flow of liquid through said housing to the closed position;
bypass means for allowing a generally small amount of liquid from said liquid source to enter said housing downstream of said means for interrupting when said means for interrupting is in the closed position; and,
means for automatically opening said means for interrupting to the normally open position once hydrostatic pressure within said liquid on the upstream and downstream sides of said means for interrupting are equal.

2. A device according to claim 1, wherein said means for moving includes a plurality of reduction gears operably connected to said means for measuring.

3. A device according to claim 2, further including a means for converting rotational movement of said reduction gears into linear movement, said means for converting connected to said means for interrupting so as to move said means for interrupting to said closed position upon the occurrence of a predetermined condition within the housing.

4. A device according to claim 3, wherein said means for converting includes a ratchet and pawl arrangement connected to said means for interrupting liquid flow for positioning said means for interrupting liquid flow to said closed position, and means for biasing said pawl toward one of said plurality of reduction gears, such that rotation of said reduction gears causes said pawl to incrementally move said means for interrupting liquid flow to the closed position.

5. A device according to claim 4, wherein said means for automatically opening said means for interrupting liquid flow includes a pressure activated switch for disengaging said pawl from said ratchet, thereby allowing said biasing means to return said means for interrupting liquid flow to the open position.

6. A device according to claim 1, wherein said means for measuring the duration of a flow of water through said housing includes a water wheel, rotatably supported within said housing.

7. A device according to claim 1, wherein said means for interrupting flow of liquid comprises a valve assembly including a valve and a cooperating valve seat such that, when said means for interrupting is in the closed position, liquid flow through said valve assembly is prevented when said valve is seated within said valve seat.

8. A device connected in a liquid supply line for preventing continuous flow of a liquid beyond a predetermined duration, comprising:
a housing;
said housing having an inlet means and an outlet means for fluidly connecting said housing in series with the liquid supply line such that liquid may flow through said housing by entering said housing inlet means and exiting said housing outlet means;
means for interrupting said flow of liquid through said housing including a valve stem biased to a normally open position and movable into a closed position in sealing engagement with a valve seat;
means for measuring duration of flow of liquid within said housing such that liquid flowing through said housing acts thereon;
said means for measuring operably connected to said means for interrupting;

said means for measuring adapted to convert energy from said flow into movement of said valve stem toward said closed position, such that after a predetermined duration of uninterrupted liquid flow said valve stem is moved into and assumes the closed position;

means for bypassing a small amount of liquid past said valve stem when said valve stem is in said closed position;

means for automatically moving said valve stem from the closed position to the open position after hydrostatic pressure at said housing inlet means equals the hydrostatic pressure at said housing outlet means, or when liquid flows through said housing for less than said predetermined duration.

9. A device according to claim 8, wherein said means for automatically moving said valve stem from the closed position to the open position includes a pressure activated switch for disconnecting said means for interrupting from said means for measuring thereby allowing said valve stem to move to the open position.

* * * * *